(12) United States Patent
Schoenberg et al.

(10) Patent No.: US 8,370,559 B2
(45) Date of Patent: Feb. 5, 2013

(54) EXECUTING A PROTECTED DEVICE MODEL IN A VIRTUAL MACHINE

(75) Inventors: Sebastian Schoenberg, Hillsboro, OR (US); Steven M. Bennett, Hillsboro, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 11/864,477

(22) Filed: Sep. 28, 2007

(65) Prior Publication Data

US 2009/0089527 A1    Apr. 2, 2009

(51) Int. Cl.
*G06F 12/14* (2006.01)
(52) U.S. Cl. ............... 711/6; 711/E12.091; 711/163
(58) Field of Classification Search .............. 711/163, 711/E12.091
See application file for complete search history.

(56) References Cited

U.S. PATENT DOCUMENTS

| 4,253,145 A * | 2/1981 | Goldberg ..................... 703/21 |
| 7,073,042 B2 * | 7/2006 | Uhlig et al. .................. 711/207 |
| 7,177,967 B2 * | 2/2007 | Jeyasingh et al. ............. 710/260 |
| 2006/0130060 A1 * | 6/2006 | Anderson et al. .............. 718/1 |

\* cited by examiner

*Primary Examiner* — Mardochee Chery
(74) *Attorney, Agent, or Firm* — Thomas R. Lane

(57) ABSTRACT

Embodiments of apparatuses, methods, and systems for executing a protected device model in a virtual machine are disclosed. In one embodiment, an apparatus includes recognition logic, memory management logic, control logic, and execution logic. The recognition logic is to recognize an indication, during execution of first code on a virtual machine, that the first code is attempting to access a device. The memory management logic is to prevent the virtual machine from accessing a portion of memory during execution of the first code, and to allow the virtual machine to access the portion of memory in response to the indication. The control logic is to transfer control of the apparatus from the first code to second code stored in the portion of memory, without exiting the virtual machine. The execution logic is to execute the second code to model the device.

20 Claims, 2 Drawing Sheets

METHOD 200

EXECUTING A PROTECTED DEVICE MODEL IN A VIRTUAL MACHINE

BACKGROUND

1. Field

The present disclosure pertains to the field of information processing, and more particularly, to the field of virtualizing resources in information processing systems.

2. Description of Related Art

Generally, the concept of virtualization of resources in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A processor in an information processing system may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

The system's privileged resources may include input/output ("I/O") devices that may be accessed through I/O transactions. These I/O transactions may be intercepted to prevent a guest from directly accessing an I/O device.

BRIEF DESCRIPTION OF THE FIGURES

The present invention is illustrated by way of example and not limitation in the accompanying figures.

DETAILED DESCRIPTION

Embodiments of apparatuses, methods, and systems for executing a protected device model in a virtual machine are described. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved if the frequency of intercepted events is minimized. Embodiments of the present invention may be used to support the virtualization of I/O devices, and may eliminate the need for a VMM intercept on some guest accesses to I/O devices. Embodiments of the present invention may be more desirable than alternative approaches to eliminating the need for VMM intercepts on guest accesses to I/O devices, such as installing an OS-specific device driver in guests or making a device model in the OS visible to guests. Embodiments of the present invention may be less costly than the first alternative and more secure than the second alternative.

Figure 1:
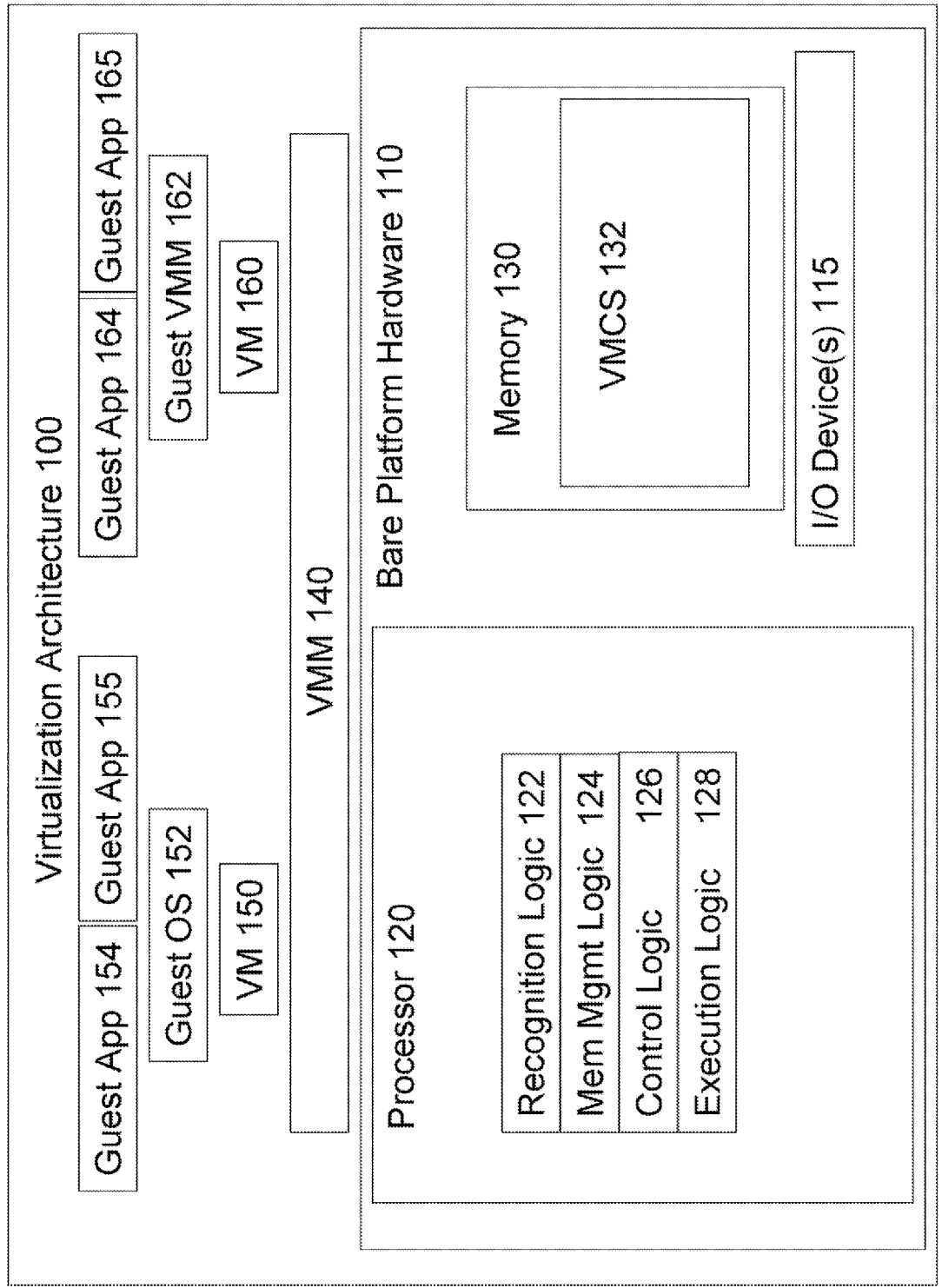
FIG. 1 illustrates a virtualization architecture according to an embodiment of the present invention.

FIG. 1 illustrates virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120, memory 130, and input/output ("I/O") device 115.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 120 may include multiple threads and multiple execution cores, in any combination. Processor 120 includes recognition logic 122, memory management logic 124, control logic 126, and execution logic 128. Processor 120 may also include any other circuitry, structures, or logic not shown in FIG. 1. Although FIG. 1, shows only one such processor 120, bare platform hardware 110 may include any number of processors.

Memory 130 may be static or dynamic random access memory, semiconductor-based read only or flash memory, magnetic or optical disk memory, any other type of medium readable by processor 120, or any combination of such mediums.

I/O device(s) 115 may represent any number of peripheral or I/O devices, such as a monitor, a keyboard, a mouse, a printer, a network interface, an information storage device, etc.

Processor 120, memory 130, and I/O device(s) 115 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, and guest OSs and applications 152, 154, 155, 162, 164, and 165.

VMM 140 may be any software, firmware, or hardware host installed to run on or accessible to bare platform hardware 110, to present VMs, i.e., abstractions of bare platform hardware 110, to guests, or to otherwise create VMs, manage VMs, and implement virtualization policies within virtualization environment 100. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed to run on VM 150 and guest OS 162 and guest applications 164 and 165 installed to run on VM 160. Although FIG. 1 shows two VMs with one guest OS and two guest applications per VM, any number of VMs may be created, and any number of guest OSes and guest applications may be installed to run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be active and running on, or in control of, processor 120. When a privileged event occurs during guest execution, or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS. Although FIG. 1 shows VMCS 132 stored in memory 130, storing a VMCS in a memory is not required by the present invention.

Returning to processor 120, recognition logic 122 may include any circuitry, structures, or logic to recognize an indication, during execution of first code (e.g., guest application 154, 155, 164, or 165), on a virtual machine (e.g., VM 150 or 160), that the first code is attempting to access a device (e.g., 110 device 115).

The indication to be recognized by recognition logic 122 may be the decoding, execution, or other recognition of a particular instruction, the detection of an attempt to execute an instruction at or using a particular address, or any other event or occurrence that may be associated with an attempt by the first code to access the device. In one embodiment, the indication may be the execution of a particular instruction, referred to in this description as a VMXFR instruction, that may be inserted into the first code at any point where the first code is attempting to access the device. The VMXFER instruction may be inserted into the first code at the appropriate locations by binary rewriting or patching of the compiled first code, under the control of the VMM. In another embodiment, the VMM may maintain a list of addresses where an attempt to access the device may be made. These addresses may be stored in VMCS 132, such that recognition logic 122 may recognize these addresses during execution of the first code.

Memory management logic 124 may include any circuitry, structures, or logic to prevent the virtual machine from accessing a portion of memory (e g., a portion of memory 130) during execution of the first code, and to allow the virtual machine to access the portion of memory in response to the indication. This portion of memory is used to store code (a "protected device model") to model the device, such that the first code may not directly access the device, but instead accesses a virtual device that corresponds to the physical device, which is directly controlled by the VMM.

Memory management logic 124 may use any known approach to allocating portions of memory to virtual machines and protecting portions of memory from virtual machines. In one embodiment, the protected device model may be stored in a memory page or pages that are not normally allocated or accessible to a VM. However, execution of a VMXFR instruction may include the reallocation of these pages to the VM. This allocation and protection may be accomplished according to any known approach for allocating and protecting memory in a virtualization architecture. For example, the protected device model page(s) may be made accessible to a VM by inserting a mapping to the page(s) in a translation lookaside buffer that provides access to physical addresses to the VM. This mapping may be stored in VMCS 132 such that it is available to the VM when the VMXFR instruction is executed, without causing a VM exit or requiring a change to the processor privilege level.

Control logic 126 may include any circuitry, structures, or logic to transfer control of processor 120 from the first code to the protected device model, without exiting the virtual machine. Execution of a VMXFR instruction may cause control logic 126 to transfer control of processor 120 from the first code to the protected device model, for example by changing an instruction pointer in processor 120 to reference an address within the portion of memory that contains the protected device model. As a result of memory management logic 124 making that portion of memory accessible to the VM in which the first code was being executed, the transfer of control to the protected device model may occur without a VM exit or a change in processor privilege level.

Execution logic 128 may include any circuitry, structures, or logic to execute the protected device model. Execution logic 128 may be within any execution core, unit, or pipeline used by processor 120 to execute instructions.

Each of logic units 122, 124, 126, and 128 may also perform additional functions, including those described as being performed by another of the logic units, and any or all of these logic units may be integrated into a single logic unit.

Embodiments of the present invention may include a variety of approaches to ensuring the integrity of the protected device model. In an embodiment using a VMXFR instruction, execution of the VMXFR instruction may cause processor 120 to analyze the first word of the protected device model page and compare it to a specific value (a "magic word"). Only if there is a match to the magic word will the processor make the protected device model page fully accessible (e.g., executable and read/writable) to the VM without a change to the processor privilege level. Otherwise, the VMXFR instruction will cause a VM exit and, either directly or indirectly (e.g., under the control of the VMM), reallocation of the protected device model page(s) such that the VM cannot access that portion of memory.

Figure 2:
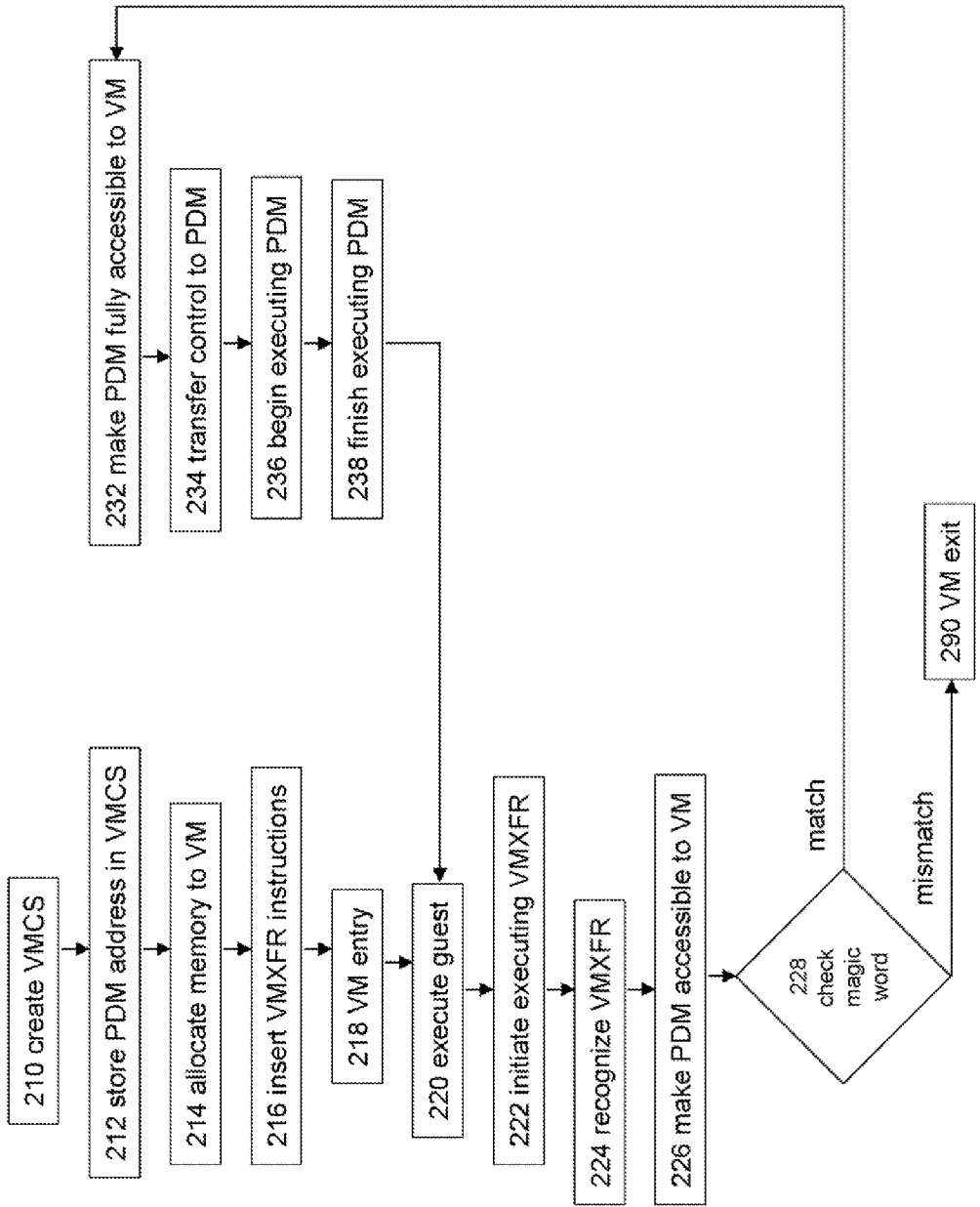
FIG. 2 illustrates a method for executing a protected device model according to an embodiment of the present invention.

FIG. 2 illustrates a method 200 for executing a protected device model according to an embodiment of the present invention. Although method embodiments of the invention are not limited in this respect, reference may be made to elements of virtualization architecture 100 of FIG. 1 to describe the method embodiment of FIG. 2.

In box 210 of method 200, VMM 140 creates VMCS 132 for a VM. In box 212, VMM 140 stores an address of a protected device model in a field in VMCS 132 such that the address may be made accessible to the VM upon execution of a VMXFR instruction. In box 214, VMM 140 populates a paging structure to support the allocation of a portion of memory 130 to the VM, where the protected device model is stored in a different portion of memory 130 that is not accessible by the VM.

In box 216, VMM 140 inserts VMXFR instructions into guest code at points where the guest would attempt to access I/O device 115. In one embodiment, where the instruction set of the processor includes variable length instructions, the VMXFR instruction is a one-byte opcode to facilitate the replacement of guest instructions. If an embodiments where one-byte opcodes are scarce, an existing but seldom-used opcode may be repurposed to serve as VMXFR; then, the protected device model may include code to check whether the instruction that is recognized by recognition logic (in box 224, below) was intended to be the repurposed opcode, and if so, emulate it.

In box 218, a VM entry is performed and control is transferred to the guest.

In box 220, the guest begins (or continues) to run on the VM. In box 222, the guest initiates the execution a VMXFR instruction by processor 120. In box 224, recognition logic 122 recognizes the VMXFR instruction as an indication that the guest is attempting to access device 115. In box 226, in response to the recognition of the VMXFR instruction, memory management logic 124 makes the protected device model accessible to the VM, e.g., by reallocating the page(s) storing the protected device model such that that portion of memory 130 is accessible to the VM.

In box 230, processor 120 analyzes the first word of the protected device model page and compares it to a magic word. If there is a match, then in box 232, processor 120 makes the protected device model page fully accessible (e.g., executable and read/writable) to the VM without a change to the processor privilege level. If there is not a match, a VM exit occurs in box 290.

From box 232, method 200 continues to box 234. In box 234, control logic 126 transfers control of processor 120 to the protected device model, without a VM exit or a change to the processor privilege level. In one embodiment, control may be transferred by copying the address of the next guest instruction from the instruction pointer to the stack or other storage location, and storing the address of the first instruction of the protected device model in the instruction pointer.

In box 236, execution logic 128 begins to execute the protected device model. In box 238, execution logic 128 executes the last instruction of the protected device model, causing memory management logic 124 to reallocate the protected device model page(s) to be not accessible to the VM, and restoring the instruction pointer to the next guest instruction. From box 238, method 200 continues at box 220, where the guest continues to run on the VM.

Within the scope of the present invention, the method illustrated in FIG. 2 may be performed in a different order, with illustrated boxes omitted, with additional boxes added, or with a combination of reordered, omitted, or additional boxes.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of apparatuses, methods, and systems for executing a protected device model in a virtual machine have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   recognition logic to recognize an indication, during execution of first code on a virtual machine, that the first code is attempting to access a device;
   memory management logic to prevent the virtual machine from accessing the device and a portion of memory during execution of the first code, except to allow the virtual machine to access the portion of memory in response to the indication;

control logic to transfer control from the first code to second code stored in the portion of memory, without exiting the virtual machine and without allowing the virtual machine to access the device; and execution logic to execute the second code to model the device.

2. The apparatus of claim 1, wherein the indication is an instruction.

3. The apparatus of claim 1, wherein the first code is a guest.

4. The apparatus of claim 1, wherein the second code is a protected device model.

5. The apparatus of claim 1, wherein the recognition logic includes an instruction storage location and is to recognize an instruction stored in the instruction storage location as the indication that the first code is attempting to access a device.

6. The apparatus of claim 1, wherein the memory management logic includes a translation lookaside buffer and is to store an entry in the translation lookaside buffer to provide the physical address of the portion of memory to the virtual machine.

7. The apparatus of claim 1, wherein the control logic includes an instruction pointer storage location and is to transfer control from the first code to the second code by storage pointer to the second code in the instruction pointer storage location.

8. The apparatus of claim 1, wherein the control logic is to transfer control without changing the privilege level.

9. A method comprising:
recognizing an indication, during execution of first code on a virtual machine in a processor, that the first code is attempting to access a device;
changing the access permissions to a protected portion of memory to allow the virtual machine to access the protected portion of memory in response to the recognizing the indication;
transferring control of the processor from the first code to second code stored in the protected portion of memory without exiting the virtual machine and without allowing the virtual machine to access the device; and
executing the second code to model the device.

10. The method of claim 9, wherein the indication is an instruction.

11. The method of claim 10, further comprising inserting the instruction into the first code at a point where the first code attempts to access the device.

12. The method of claim 9, wherein the indication is an address.

13. The method of claim 12, further comprising storing the address in a virtual machine control structure to provide access to the identity of the address during execution of the first code on the virtual machine.

14. The method of claim 9, wherein changing the access permissions includes inserting an entry in a translation lookaside buffer to provide the virtual machine with a physical address of the protected portion of memory.

15. The method of claim 9, wherein transferring control includes storing a pointer to the protected portion memory in an instruction pointer.

16. The method of claim 9, wherein transferring control is without changing the privilege level of the processor.

17. A system comprising:
a memory;
a device; and
a processor including:
recognition logic to recognize an indication, during execution of first code on a virtual machine, that the first code is attempting to access the device;
memory management logic to prevent the virtual machine from accessing the device and a portion of the memory during execution of the first code, except to allow the virtual machine to access the portion of memory in response to the indication;
control logic to transfer control from the first code to second code stored in the portion of memory, without exiting the virtual machine and without allowing the virtual machine to access the device; and
execution logic to execute the second code to model the device.

18. The system of claim 17, wherein the memory is to store a virtual machine control structure for the virtual machine.

19. The system of claim 18, wherein the virtual machine control structure is to store an address of the second code to provide to the memory management logic during execution on the virtual machine.

20. The system of claim 19, wherein the memory management logic includes a translation lookaside buffer accessible to the virtual machine, and is to insert a mapping to the second code into the translation lookaside buffer in response to recognition of the indication.

* * * * *